(12) United States Patent
Kim

(10) Patent No.: US 8,861,917 B2
(45) Date of Patent: Oct. 14, 2014

(54) OPTO-ELECTRIC CIRCUIT BOARD INCLUDING METAL-SLOTTED OPTICAL WAVEGUIDE AND OPTO-ELECTRIC SIMULTANEOUS COMMUNICATION SYSTEM

(75) Inventor: Jin Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 203 days.

(21) Appl. No.: 13/531,431

(22) Filed: Jun. 22, 2012

(65) Prior Publication Data

US 2013/0011094 A1   Jan. 10, 2013

(30) Foreign Application Priority Data

Jul. 7, 2011   (KR) .................. 10-2011-0067366
May 31, 2012   (KR) .................. 10-2012-0058458

(51) Int. Cl.
*G02B 6/10* (2006.01)
*G02B 6/122* (2006.01)

(52) U.S. Cl.
CPC ................................. *G02B 6/1226* (2013.01)
USPC ............................................................ 385/131

(58) Field of Classification Search
None
See application file for complete search history.

(56) References Cited

U.S. PATENT DOCUMENTS

| | | | |
|---|---|---|---|
| 7,343,060 B2 * | 3/2008 | Ohtsu et al. ...................... | 385/14 |
| 8,311,375 B2 * | 11/2012 | Kodama et al. .................. | 385/14 |
| 8,428,401 B2 * | 4/2013 | Tilly ................................ | 385/14 |
| 2005/0123231 A1 | 6/2005 | Niitsu et al. | |
| 2006/0120666 A1 * | 6/2006 | Ohtorii .......................... | 385/33 |
| 2008/0112713 A1 | 5/2008 | Guo | |
| 2009/0080832 A1 * | 3/2009 | Horine et al. ................... | 385/14 |

FOREIGN PATENT DOCUMENTS

| | | |
|---|---|---|
| JP | 2005-181610 A | 7/2005 |
| JP | 2006-101134 A | 4/2006 |
| KR | 10-2006-0010867 A | 2/2006 |
| KR | 10-0809396 B1 | 3/2008 |

OTHER PUBLICATIONS

Jia Jiang et al., "Long-range surface plasmon polariton waveguides embedded in fluorinated polymer", Applied Optics, Jul. 20, 2008, pp. 3892-3900, vol. 47, No. 21, Optical Society of America.

* cited by examiner

*Primary Examiner* — Sung Pak

(57) ABSTRACT

Disclosed are an opto-electric circuit board including a metal-slotted optical waveguide and an opto-electric simultaneous communication system. The opto-electric circuit board includes a lower metal thin film; a dielectric substance formed above the lower metal thin film; an upper metal thin film formed above the dielectric substance; and intermediate metal thin films that form optical waveguides at a predetermined interval on the same plane in the dielectric substance.

19 Claims, 5 Drawing Sheets

OPTO-ELECTRIC CIRCUIT BOARD INCLUDING METAL-SLOTTED OPTICAL WAVEGUIDE AND OPTO-ELECTRIC SIMULTANEOUS COMMUNICATION SYSTEM

CROSS-REFERENCE TO RELATED APPLICATIONS

This application is based on and claims priority from Korean Patent Application Nos. 10-2011-0067366, filed on Jul. 7, 2011, and 10-2012-0058458, filed on May 31, 2012, with the Korean Intellectual Property Office, the disclosure of which is incorporated herein in its entirety by reference.

TECHNICAL FIELD

The present disclosure relates to an opto-electric circuit board, and more particularly, an opto-electric circuit board including a metal-slotted optical waveguide and an opto-electric simultaneous communication system that include a multi-layered metal thin film and a dielectric substance interposed at the center of the metal thin film.

BACKGROUND

The information processing technology between semiconductor chips or boards using an optical communication technology is getting spotlights because it can solve the problems contained in copper interconnect such as the electromagnetic interference (EMI), impedance mismatch, and signal distortion (skew). Therefore, an opto-electric interconnect module using an optical interconnect and an electric interconnect as interconnect of a printed circuit board is suggested. However, the manufacturing cost of a dielectric optical waveguide used for the opto-electric interconnect module is very expensive.

Recently, a metal line optical waveguide in which a metal line is inserted in the dielectric material is getting spotlight as a technology that replaces the dielectric optical waveguide. However, the waveguide loss of the metal line waveguide is much higher than the waveguide loss of the dielectric optical waveguide. A very thin metal line is required and it is difficult to simultaneously transmit high power line or electric signal together with the optical signal due to the high resistance of the metal line.

SUMMARY

The present disclosure has been made in an effort to provide an opto-electric circuit board including a metal-slotted optical waveguide and an opto-electric simultaneous communication system that are capable of simultaneously transmit an optical signal and an electric signal using a metal thin film.

An exemplary embodiment of the present disclosure provides an opto-electric circuit board, including: a lower metal thin film; a dielectric substance formed above the lower metal thin film; an upper metal thin film formed above the dielectric substance; and intermediate metal thin films that form optical waveguides at a predetermined interval on the same plane in the dielectric substance.

Another exemplary embodiment of the present disclosure provides an opto-electric simultaneous communication system, including: an opto-electric circuit board that includes a lower metal thin film; a dielectric substance formed above the lower metal thin film; an upper metal thin film formed above the dielectric substance; intermediate metal thin films that form optical waveguides at a predetermined interval on the same plane in the dielectric substance; and electric interconnects formed above the upper metal thin film or below the lower metal thin film and connected with the upper metal thin film, the intermediate metal thin films, and the lower metal thin film through a via so as to communicate with each other; a connector module that performs electric communication through the electric interconnects; and an opto-electric element that performs optical communication through the optical waveguide.

According to exemplary embodiments of the present disclosure, by providing an opto-electric circuit board including a metal-slotted optical waveguide and an opto-electric simultaneous communication system that transmit an optical signal through a dielectric substance inserted in a metal thin film and transmit an electric signal through the metal thin film, it is possible to simultaneously transmit the electric signal and the optical signal with a smaller waveguide loss.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. If it is considered that the detailed description of the configuration or function of the related art clouds the gist of the present disclosure, the description thereof will be omitted.

Figure 1:
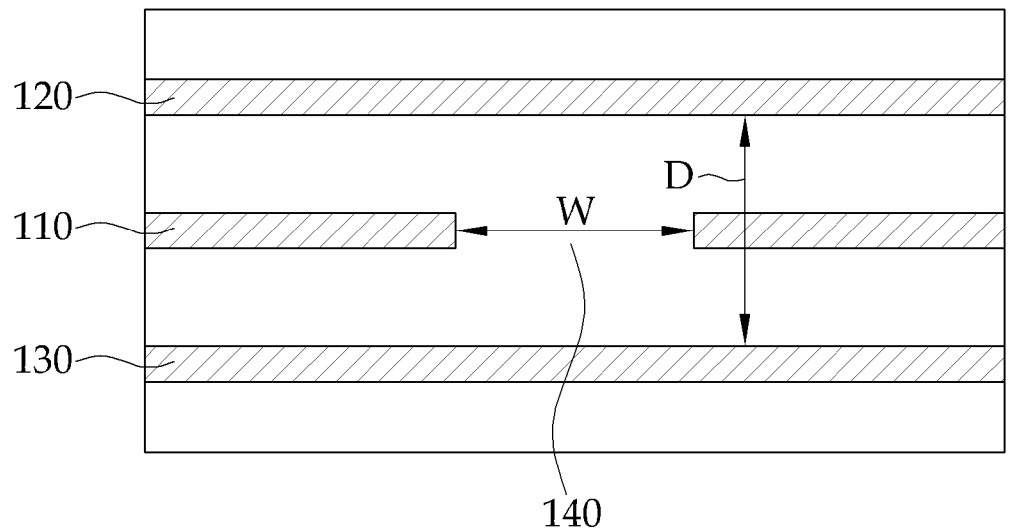
FIG. 1 is a cross-sectional diagram illustrating a configuration of an opto-electric circuit board according to a first exemplary embodiment of the present disclosure.

FIG. 1 is a cross-sectional diagram illustrating a configuration of an opto-electric circuit board according to a first exemplary embodiment of the present disclosure.

Referring to FIG. 1, an opto-electric circuit board according to an exemplary embodiment of the present disclosure includes intermediate metal thin films 110 that form optical waveguides at a predetermined interval W on the same plane in a dielectric substance 140, an upper metal thin film 120 that is formed above the intermediate metal thin film 110, a lower metal thin film 130 that is formed below the intermediate metal thin film 110, and the dielectric substance 140 that is formed between the upper metal thin film 120 and the lower metal thin film 130. Herein, the upper metal thin film 120 and the lower metal thin film 130 are disposed at a predetermined interval D. In this case, the upper metal thin film 120 may be omitted.

The metal thin films 110, 120 and 130 are formed of a metal such as silver (Ag), gold (Au), aluminum (Al), and copper (Cu), or include one of them or an alloy or a combination of two of them.

The dielectric substance 140 includes a flexible optical polymer. Therefore, the opto-electric circuit board according to the exemplary embodiment may be used for an opto-electric communication between PCB boards that is required to be flexible.

The metal thin films 110, 120 and 130 may be formed to have a thickness of 0.1 to 100 μm.

The intermediate metal thin film 110 may be formed on a lower surface of the upper metal thin film 120 or an upper surface of the lower metal thin film 130 in the dielectric substance 140. Further, the intermediate metal thin film 110 may be formed of a single layer or multiple layers.

Figure 2A:
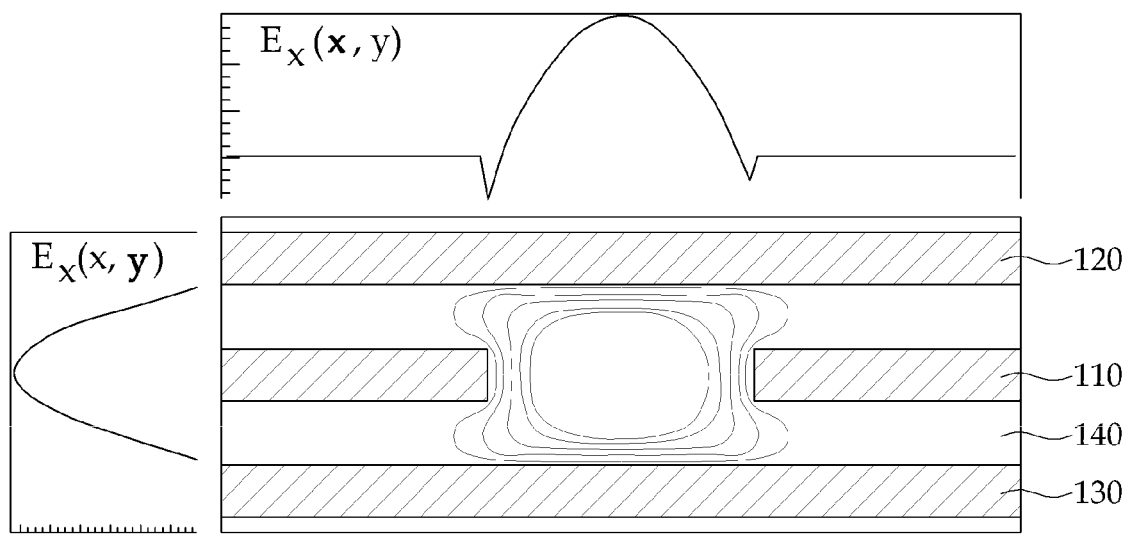
FIGS. 2A and 2B are a view illustrating an optical guide mode of the opto-electric circuit board according to the first exemplary embodiment of the present disclosure.
Figure 2B:
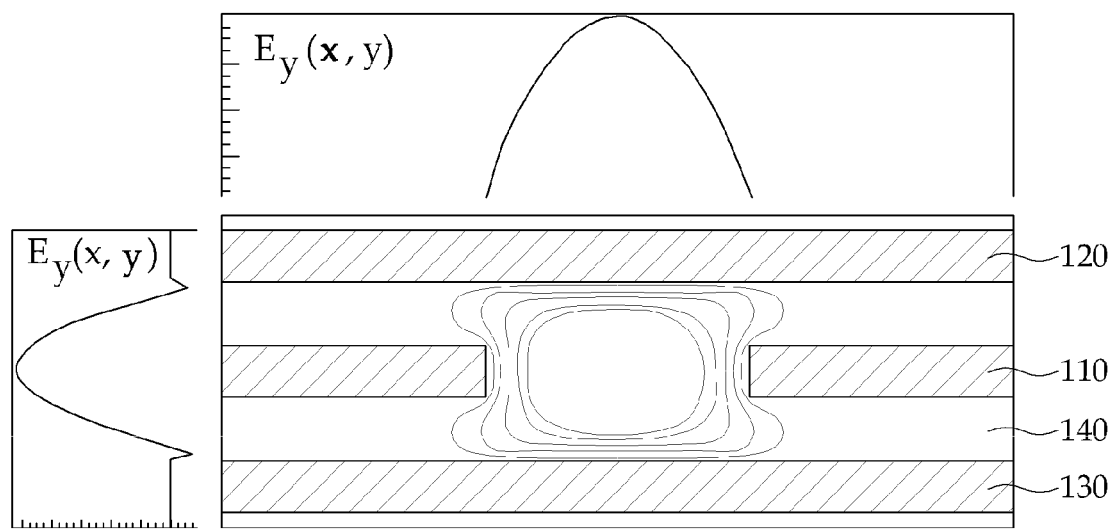

FIGS. 2A and 2B are a view illustrating an optical guide mode of the opto-electric circuit board according to the first exemplary embodiment of the present disclosure. Specifically, FIG. 2A shows an analogous TE mode for a wavelength of 1310 nm and FIG. 2B shows an analogous TM mode for a wavelength of 1310 nm. In this case, the thickness of the metal thin films 110, 120, and 130 are 14 μm and the height and width of the dielectric substance 140 that is located at the center are 50 μm.

If the intermediate metal thin film 110 is not provided in the opto-electric circuit board, the opto-electric circuit board is an optical waveguide having a metal-dielectric substance-metal structure. Light that is restricted in a vertical direction proceeds in a direction perpendicular to the surface through the dielectric substance but is not restricted in a horizontal direction, which cannot be applied to the optical communication.

In the opto-electric circuit board according to the exemplary embodiment, the intermediate metal thin film 110 is inserted in the dielectric substance 140 with a predetermined gap so that the light is restricted in the vertical direction and the horizontal direction to form a guide mode.

Therefore, as shown in FIG. 2A, in the analogous TE mode, the phase of the electric field is changed at the edge of the dielectric substance 140 in the horizontal direction, which is called as a surface Plasmon effect that is excited at an interface of the metal thin films 110, 120, and 130 and the dielectric substance 140.

As shown in FIG. 2B, in the analogous TM mode, the phase of the electric field is changed at the edge of the dielectric substance 140 in the vertical direction.

Figure 3:
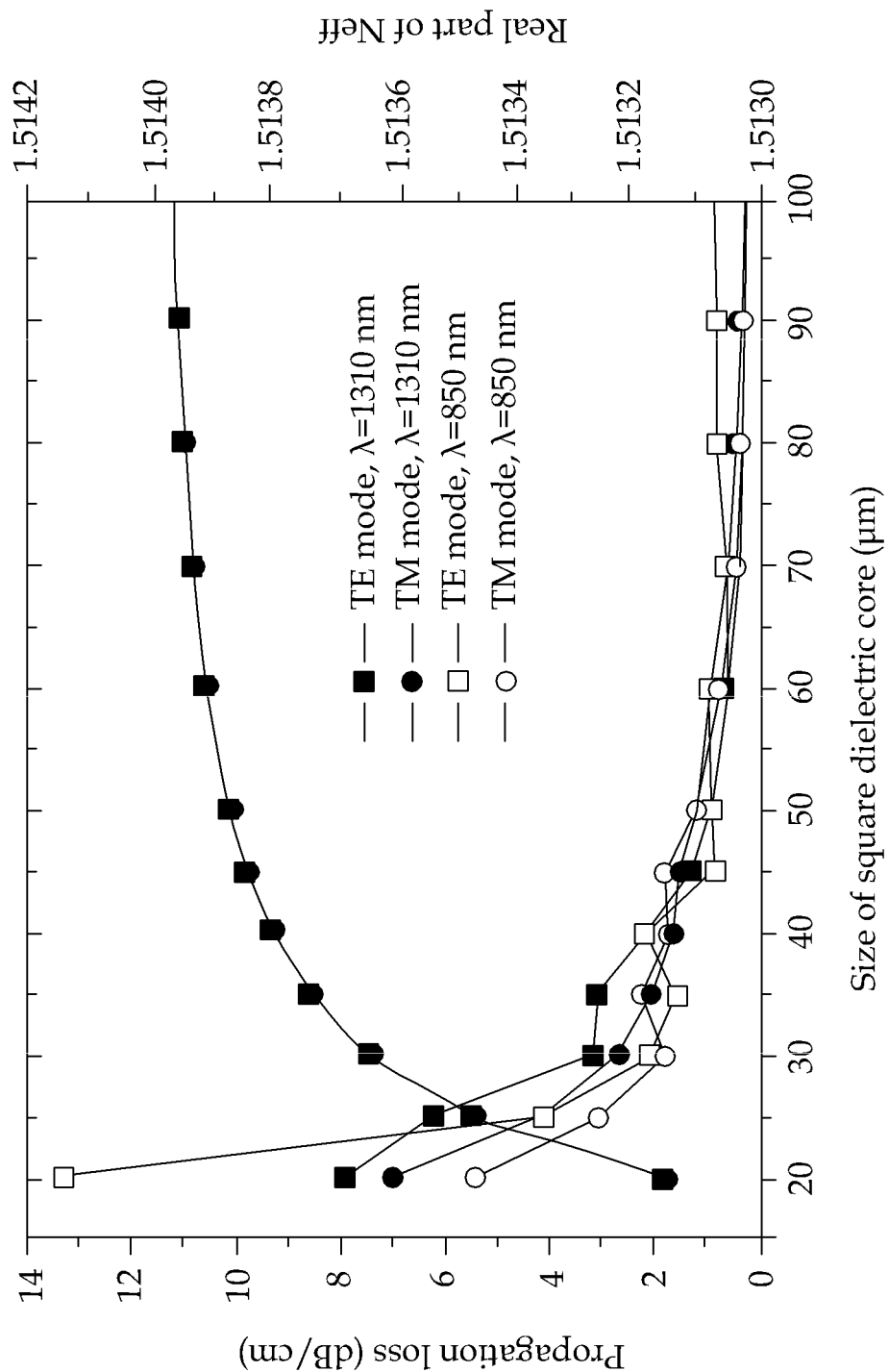
FIG. 3 is a graph illustrating a simulation result of a waveguide loss of the opto-electric circuit board according to the first exemplary embodiment of the present disclosure.

FIG. 3 is a graph illustrating a simulation result of a waveguide loss of the opto-electric circuit board according to the first exemplary embodiment of the present disclosure.

Generally, in the opto-electric circuit board, the waveguide loss is caused by the surface Plasmon effect generated at the interface of the metal thin film and the dielectric substance.

Referring to FIG. 3, it is known that as width and length of the dielectric substance are increased, the waveguide loss is reduced. That is, when the width and the length of the dielectric substance is 50 μm or larger, the waveguide loss is 1 db/cm or less.

Referring to FIG. 3, it is also known that as the wavelength of the optical wave becomes shorter, the waveguide loss is decreased. In other words, even though a difference in the polarization is not significant, the analogous TM mode has a slightly higher waveguide loss than the analogous TE mode.

In contrast, the waveguide loss is less dependent on the thickness of the metal thin film.

Figure 4:
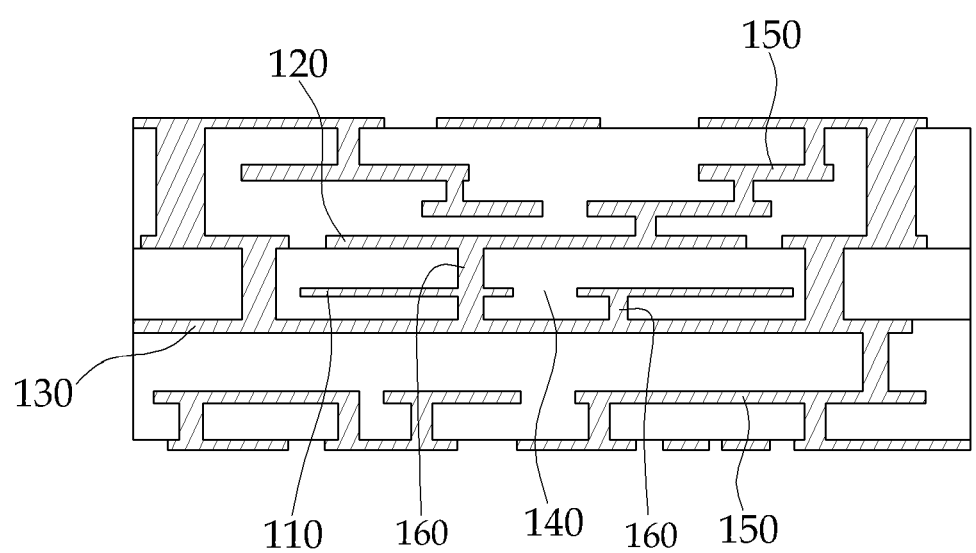
FIG. 4 is a cross-sectional diagram illustrating a configuration of an opto-electric circuit board in which an electric interconnect is additionally mounted.

FIG. 4 is a cross-sectional diagram illustrating a configuration of an opto-electric circuit board in which an electric interconnect is additionally mounted.

Referring to FIG. 4, in the opto-electric circuit board according to an exemplary embodiment, electric interconnects 150 for a PCB board may be disposed below the lower metal thin film 130 or above the upper metal thin film 120. Therefore, the optical signal is transmitted through an optical waveguide of the opto-electric circuit board and the electric signal is transmitted through additionally provided electric interconnect 150.

The electric interconnect 150 may be electrically conducted with the lower metal thin film 130, the intermediate metal thin film 110, and the upper metal thin film 120 through a via 160. Therefore, an electric signal of the electric interconnect 150 may be transmitted through the lower metal thin film 130, the intermediate metal thin film 110, and the upper metal thin film 120.

Figure 5:
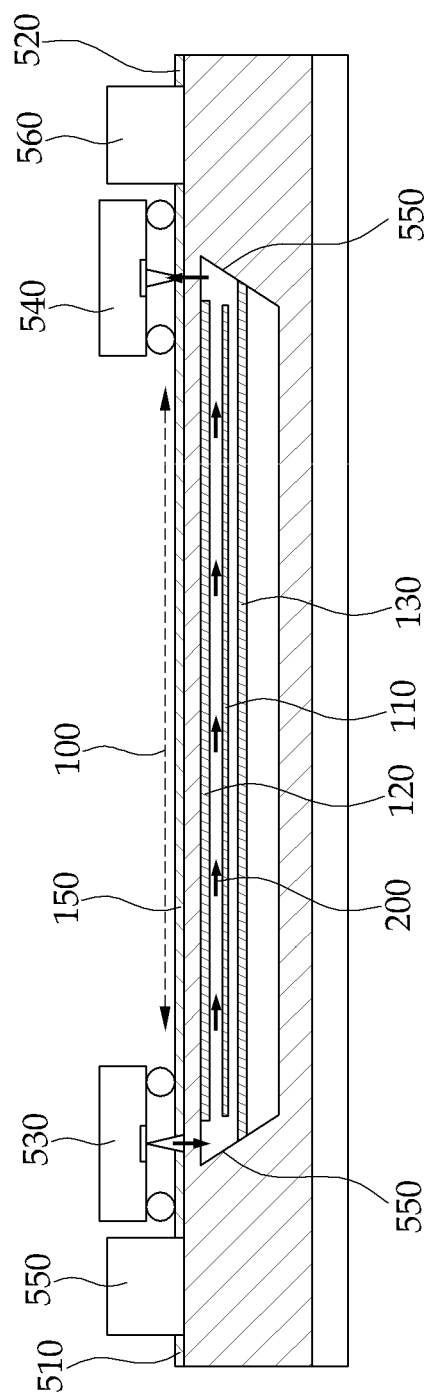
FIG. 5 is a view illustrating a configuration of an opto-electric simultaneous communication system including the opto-electric circuit board according to a second exemplary embodiment of the present disclosure.

FIG. 5 is a view illustrating a configuration of an opto-electric simultaneous communication system including the opto-electric circuit board according to a second exemplary embodiment of the present disclosure.

Referring to FIG. 5, an opto-electric circuit board of an opto-electric simultaneous communication system according to a second exemplary embodiment includes an intermediate metal thin film 110, an upper metal thin film 120, a lower metal thin film 130, a dielectric substance 140, and a metal interconnect 150, which are similar to the opto-electric circuit board of FIGS. 1 and 4. Since the functions of the components of the opto-electric circuit board of the opto-electric simultaneous communication system are same as the opto-electric circuit board of FIGS. 1 and 4, the detailed description thereof will be omitted.

The opto-electric simultaneous communication system according to the second exemplary embodiment of the present disclosure further includes a transmitting connector module 510 and a receiving connector module 520 which are located at both ends of the opto-electric circuit board, a light emitting element 530 that is located between the opto-electric circuit board and the transmitting connector module 510, and a light receiving element 540 that is located between the opto-electric circuit board and the receiving connector module 520. Additionally, the opto-electric simultaneous communication system may further include IC chips 550 and 560 and an electric circuit that control the operations of the light emitting element 530 and the light receiving element 540 at both sides of the opto-electric circuit board.

The light emitting element 530 may be an vertical cavity surface emitting laser (VCSEL), a laser diode (LD), or a light emitting diode (LED).

The opto-electric simultaneous communication system according to an exemplary embodiment includes a mirror 570 provided at an end of the optical waveguide in order to increase an optical coupling efficiency between the light emitting element 530 and the optical waveguide.

The opto-electric simultaneous communication system may further include a polarizer (not shown) provided below the light emitting element 530 in order to control a polarization property of a vertical optical signal and a lens (not shown) provided below the light emitting element 530 and the light receiving element 540 in order to collect the vertical optical signal.

Hereinafter, the operation of the opto-electric simultaneous communication system according to the second exemplary embodiment of the present disclosure will be described.

A low speed electric signal generated in an arbitrary PCB board is applied to the opto-electric circuit board through the transmitting connector module 510.

Thereafter, the low speed electric signal 100 is transmitted to the receiving connector module 520 through the electric interconnect 150 and the metal thin films 110, 120 and 130 formed on the opto-electric circuit board.

A high speed electric signal is converted into an optical signal 200 by the light emitting element 530 and the converted optical signal 200 is transmitted to the light receiving element 540 through the optical waveguide of the opto-electric circuit board and then electro-optically converted by the light receiving element 540 to be transferred to an arbitrary PCB board. Therefore, the IC chips 550 and 560 may communicate with each other using the optical signal 200.

Here, the transmission of the optical signal 200 from the light emitting element 530 to the opto-electric circuit board and the transmission of the optical signal 200 from the opto-electric circuit board to the light receiving element 540 are performed by a mirror 570, but are not limited thereto. The light emitting element 530 and the light receiving element 540 meet perpendicularly to the opto-electric circuit board to perform electric/optical communication.

By the above-mentioned principle, the opto-electric circuit board may be used as the opto-electric simultaneous communication system that is capable of simultaneously transmitting the optical signal and the electric signal. Since the dielectric substance of the opto-electric circuit board is formed of flexible optical polymer, the opto-electric circuit board according to the exemplary embodiment may be used for the opto-electric communication between PCB boards which is required to be flexible.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An opto-electric circuit board, comprising:
    a lower metal thin film;
    an upper metal thin film disposed over the lower metal thin film;
    first and second intermediate metal thin films disposed on a same plane between the lower and upper metal thin films, the first and second intermediate metal thin films separated from each other by a first distance, the first and second intermediate metal thin films each separated from the upper metal thin film by a second distance along a direction perpendicular to the same plane, the first and second intermediate metal thin films each separated from the lower metal thin film by a third distance along the direction; and
    a dielectric core disposed between the upper and lower metal thin films and between the first and second intermediate metal thin films.

2. The opto-electric circuit board of claim 1, wherein the intermediate metal thin films, the upper metal thin film and the lower metal thin film include at least one of silver (Ag), gold (Au), aluminum (Al), and copper (Cu).

3. The opto-electric circuit board of claim 1, wherein the thicknesses of the intermediate metal thin film, the upper metal thin film, and the lower metal thin film are 0.1 to 100 μm.

4. The opto-electric circuit board of claim 1, wherein the intermediate metal thin films are formed of multiple layers.

5. The opto-electric circuit board of claim 1, further comprising:
    electric interconnects disposed above the upper metal thin film or below the lower metal thin film.

6. The opti-electric circuit board of claim 5, wherein the electric interconnects are connected to the upper metal thin film, the intermediate metal thin film, and the lower metal thin film though a via to be electrically conducted.

7. The opto-electric circuit board of claim 5, wherein an electric signal is transmitted through the electric interconnects, the intermediate metal thin film, the upper metal thin film, and the lower metal thin film.

8. The opto-electric circuit board of claim 1, wherein the dielectric core includes a flexible optical polymer.

9. An opto-electric simultaneous communication system, comprising:
    an opto-electric circuit board including:
        an optical waveguide having:
            a lower metal thin film;
            an upper metal thin film disposed over the lower metal thin film;
            first and second intermediate metal thin films disposed on the same plane between the lower and upper metal thin films, the first and second intermediate metal thin films separated from each other by a first distance, the first and second intermediate metal thin films each separated from the upper metal thin film by a second distance along a direction perpendicular to the same plane, the first and second intermediate metal thin films each separated from the lower metal thin film by a third distance along the direction; and
            a dielectric core disposed between the upper and lower metal thin films and between the first and second intermediate metal thin films;
        electric interconnects formed below the lower metal thin film or above the upper metal thin film;
        a connector module that performs electric communication through the electric interconnects; and
        an opto-electric element that performs optical communication through optical waveguides.

10. The opto-electric simultaneous communication system of claim 9, wherein the electric interconnects are connected to the upper metal thin film, the intermediate metal thin film, and the lower metal thin film though a via to be electrically conducted.

11. The opto-electric simultaneous communication system of claim 9, wherein the connect module includes:
    a transmitting connector module that transmits a low speed electric signal received from the external through the electric interconnects; and
    a receiving connector module that transmits the low speed electric signal received from the transmitting connector module to the outside.

12. The opto-electric simultaneous communication system of claim 9, wherein the opto-electric element includes:
    a light emitting element that converts a high speed electric signal into an optical signal and transmits the converted optical signal through the optical waveguide; and a light receiving element that converts the optical signal received from the light emitting element into an electric signal.

13. The opto-electric simultaneous communication system of claim 12, wherein the light emitting element is any one of an vertical cavity surface emitting laser (VCSEL), a laser diode (LD) and a light emitting diode (LED).

14. The opto-electric simultaneous communication system of claim 12, further comprising:
a mirror disposed at an end of the optical waveguide in order to increase an optical coupling efficiency between the light emitting element and the optical waveguide.

15. The opto-electric simultaneous communication system of claim 14, further comprising:
a polarizer disposed below the light emitting element to adjust polarization property of a vertical optical signal.

16. The opto-electric simultaneous communication system of claim 14, further comprising:
a lens disposed below the light emitting element and the light receiving element to collect a vertical optical signal.

17. The opto-electric simultaneous communication system of claim 10, wherein the dielectric core includes a flexible optical polymer.

18. The opto-electric circuit board of claim 1, wherein an electric signal is transmitted through the first and second intermediate metal thin films, the upper metal thin film, and the lower metal thin film, and
wherein an optic signal is transmitted through the dielectric core when the electric signal is transmitted.

19. The opto-electric circuit board of claim 1, wherein the dielectric core has a square shape whose width is equal to or greater than 50 μm.

* * * * *